US008463840B2

(12) United States Patent
Lee et al.

(10) Patent No.: US 8,463,840 B2
(45) Date of Patent: Jun. 11, 2013

(54) METHOD FOR SELECTING NODE IN NETWORK SYSTEM AND SYSTEM THEREOF

(75) Inventors: Yongju Lee, Daejeon (KR); Jinhwan Jeong, Seoul (KR); Songwoo Sok, Daejeon (KR); Yoohyun Park, Daejeon (KR); Changsoo Kim, Daejeon (KR); Choonseo Park, Daejeon (KR); Hagyoung Kim, Daejeon (KR); Myungjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1013 days.

(21) Appl. No.: 12/497,379

(22) Filed: Jul. 2, 2009

(65) Prior Publication Data

US 2010/0005273 A1 Jan. 7, 2010

(30) Foreign Application Priority Data

Jul. 4, 2008 (KR) .................. 10-2008-0064861

(51) Int. Cl.
*G06F 15/16* (2006.01)
(52) U.S. Cl.
USPC ........................................................ 709/201
(58) Field of Classification Search
USPC ........................................................ 709/201
See application file for complete search history.

(56) References Cited

U.S. PATENT DOCUMENTS

| 7,249,280 | B2 | 7/2007 | Lamport et al. |
| 7,913,042 | B2* | 3/2011 | Ogihara et al. ............ 711/154 |
| 8,005,861 | B2* | 8/2011 | Reddy et al. ............... 707/790 |
| 2005/0193084 | A1* | 9/2005 | Todd et al. ................ 709/214 |

OTHER PUBLICATIONS

Cheung (The Grid Protocol: A High Performance Scheme for Maintaining Replicated Data. Emory University, 1990. pp. 1-28).*
Shun Yan Cheung et al., "The Grid Protocol: A High Performance Scheme for Maintaining Replicated Data", *IEEE Transactions on Knowledge and Data Engineering*, Dec. 1992, pp. 582-592.
Akhil Kumar, "Hierarchical Quorum Consensus: A New Algorithm for Managing Replicated Data", *IEEE Transactions on Computers*, Sep. 1991, pp. 996-1004.
Ricardo Jimenez-Peris et al., " Are Quorums an Alternative for Data Replication?", *ACM Transactions on Database Systems*, Sep. 2003, pp. 257-294.
David K. Gifford, "Weighted Voting for Replicated Data", ACM Operating Systems Reivew, *SIGOPS*, 1979, pp. 150-162.
D. Agrawal et al., "The Generalized Tree Quorum Protocol: An Efficient Approach for Managing Replicated Data", *ACM Transactions on Database Systems*, Dec. 1992, pp. 689-717.

(Continued)

*Primary Examiner* — John Macllwinen
(74) *Attorney, Agent, or Firm* — Lowe Hauptman Ham & Berner LLP

(57) ABSTRACT

The present invention relates to a method for selecting a node in a network system and a system thereof. The method performs a writing operation on a majority of the nodes included in at least one cell selected by dividing a network area including a plurality of nodes existing on a large-capacity cluster into a plurality of cells and performs a reading work on the majority of the nodes included in the cells selected by selecting predetermined cells of the divided cells. The present invention minimizes the accessibility of the network by binding the adjacent nodes to form the cells and access to each cell and optimizes hierarchy for the network access by selecting the node for each cell, thereby making it possible to minimize the network access cost.

11 Claims, 12 Drawing Sheets

OTHER PUBLICATIONS

Korean Office Action dated Nov. 26, 2009 for Korean Patent Application No. 10-2008-0064861, which cites the reference as attached herewith.

Jehn-Ruey Jiang; "The Column Protocol: A High Availability and Low Message Cost Solution for Managing Replicated Data"; Pergamon; Information Systems; vol. 20; No. 8; 1995; pp. 687-696.

* cited by examiner

|     | READING/ WRITING | NUMBER OF NODES | WRITING | READING |
|-----|------------------|-----------------|---------|---------|
| (a) | SINGLE READING/ ALL WRITING | 23 | 23 | 1 |
| (b) | MAJORITY VOTES | | 12 | 12 |
| (c) | CELL APPROXIMATION | | 10 | 6 |

METHOD FOR SELECTING NODE IN NETWORK SYSTEM AND SYSTEM THEREOF

RELATED APPLICATIONS

The present application claims priority to Korean Patent Application Serial Number 10-2008-0064861, filed on Jul. 4, 2008, the entirety of which is hereby incorporated by reference.

BACKGROUND OF THE INVENTION

1. Field of the Invention

The present invention relates to a method for selecting a node in a network system and a system thereof, and in particular, to a method for selecting a node in a network system that can minimize a network access delay on a large-capacity cluster and a system thereof.

2. Description of the Related Art

Generally, there is a need to maintain coherence on data changed in a cluster system, which provides a single computer image, from several computing powers. The reason is that when the change is made in one node and the reading of the data changed in other nodes is then performed, coherent data should be obtained. To this end, there is a data replication protocol to reflect the change in one node on other nodes.

As one example, there is a read-one write-all (ROWA) method that can reflect a writing change in one node on all other nodes and perform a reading in any nodes. As other examples, there are a hierarchy, a quadrangle, a triangle, a tree, etc. according to a logical structure in methods for using the logical structure in view of a configuration of nodes.

However, in the above methods, a large number of nodes participate in the reading/writing on the large-capacity cluster, such that it causes a problem in that the network connection is delayed. Therefore, a need exists for a method to reduce the number of nodes that participates in the reading/writing.

SUMMARY OF THE INVENTION

It is an object of the present invention to provide a method for selecting a node in a network system and a system thereof, which forms cells by binding adjacent nodes to minimize accessibility of a network and optimize hierarchy for a network access, thereby minimizing network access cost.

In order to achieve the above object, there is provided a method for selecting a node in a network system according to the present invention, including: dividing a network area including a plurality of nodes existing on a large-capacity cluster into a plurality of cells; selecting any one of the plurality of divided cells as a writing reference cell and selecting the writing reference cell and at least one cell adjacent to the writing reference cell to designate as writing cells; selecting majority nodes for each writing cell among the nodes included in the writing cells; and performing the writing operation on the selected nodes for each writing cell.

Further, in order to achieve the above object, there is provided a method for selecting a node in a network system according to the present invention including a plurality of nodes existing on a large-capacity cluster and having a network area in which a plurality cells are divided, including: selecting any one of the plurality of divided cells as a reading reference cell and selecting the reading reference cell and at least one cell adjacent to the reading reference cell to designate as reading cells; selecting a majority of the nodes designated for each reading cell among nodes included in the reading cells; and performing a reading operation on the selected nodes for each reading cell.

Meanwhile, the network system according to the present invention performs the method for selecting a node, includes the plurality nodes existing on the large-capacity cluster, and the network area in which the plurality of cell are divided.

The present invention minimizes the accessibility of the network by binding the adjacent nodes to form the cells and accessing each cell and optimizes the hierarchy for the network access by selecting the majority of the nodes for each cell, thereby making it possible to minimize the network access cost.

BRIEF DESCRIPTION OF THE DRAWINGS

FIGS. 5 to 11 are diagrams referenced for explaining an operation of the method for selecting a node according to the present invention; and FIG. 12 shows a comparison table of the method for selecting a node according to the present invention.

DETAILED DESCRIPTION OF THE PREFERRED EMBODIMENTS

Hereinafter, exemplary embodiments of the present invention will be described with reference to the accompanying drawings.

Figure 1:
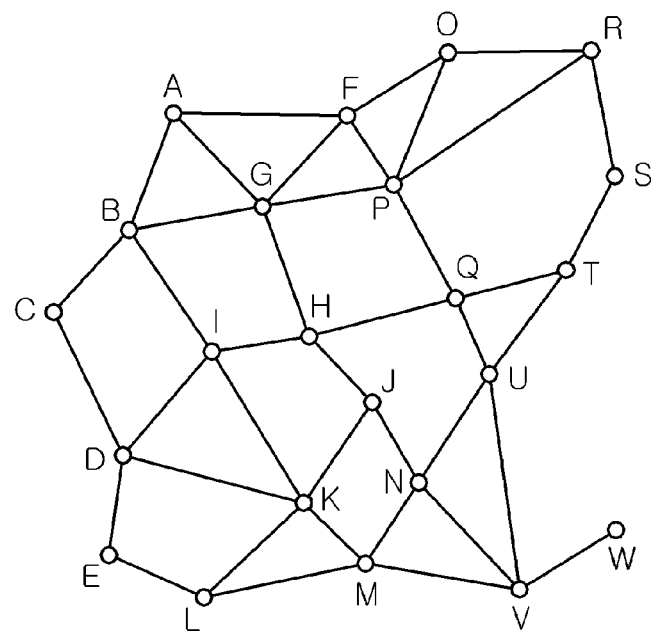
FIG. 1 shows a network system applied to a method for selecting a node according to the present invention.

FIG. 1 shows a network system applied to a method for selecting a node according to the present invention.

Referring to FIG. 1, assuming that there are a total of 23 virtual nodes (A to W) in a network system, these nodes are not uniformly arranged, but are separately arranged, such that they have different distance values between the nodes, respectively. Therefore, an access delay time for each node is different. Describing U, V, and W among the nodes of FIG. 1 as an example, a distance between U-V is longer than a distance between V-W. Therefore, the access delay time from V to U is longer than the access delay time from V to W.

Therefore, upon selecting the nodes in the network system, the access delay time to the network is minimized by selecting minimum nodes adjacent to each other.

Figure 2:
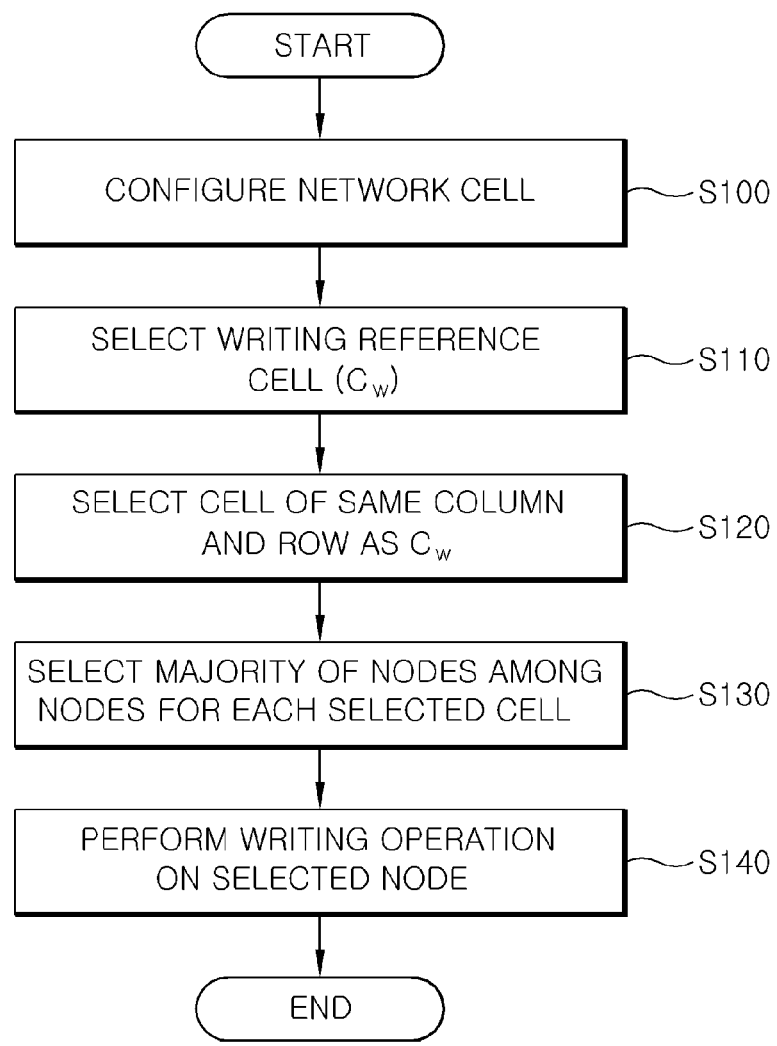
FIGS. 2 and 3 are flow charts showing an operational flow of the method for selecting a node according to the present invention.

FIG. 2 is a flow chart showing the method for selecting a node in the network system according to one embodiment of the present invention and in particular, shows the method for selecting a node to perform a writing operation.

Referring to FIG. 2, a cell group is formed by dividing a network area including a plurality of nodes existing on a large-capacity cluster into a plurality of cells (S100). Herein, the cell group is divided in a grid form and preferably, a column and row has an N×N structure. However, the cell group is not limited thereto. At this time, each of the divided cells includes all of the plurality of nodes and the number of plurality of nodes is larger than the number of plurality of cells. The embodiment thereof will be described with reference to FIG. 4.

When performing the writing operation on the plurality of nodes, any one of the plurality of divided cells is selected as a writing reference cell ($C_W$) (S110). At this time, the writing cell is designated by selecting the writing reference cell ($C_W$) and at least one cell adjacent to the writing reference cell ($C_W$) (S120). Herein, the writing cell includes a cell arranged on a column and row that exists at the same position as the writing reference cell ($C_W$) and the writing reference cell ($C_W$).

If the writing cell is selected in 'S110' and 'S120' steps, the nodes included in each cell designated as the writing cell are detected. At this time, a majority among the nodes included in the cells designated as the writing cells are selected (S130) and the writing operation is performed on the selected nodes (S140). Each of 'S130' and 'S140' steps is performed for each cell selected as the writing cells.

Figure 3:
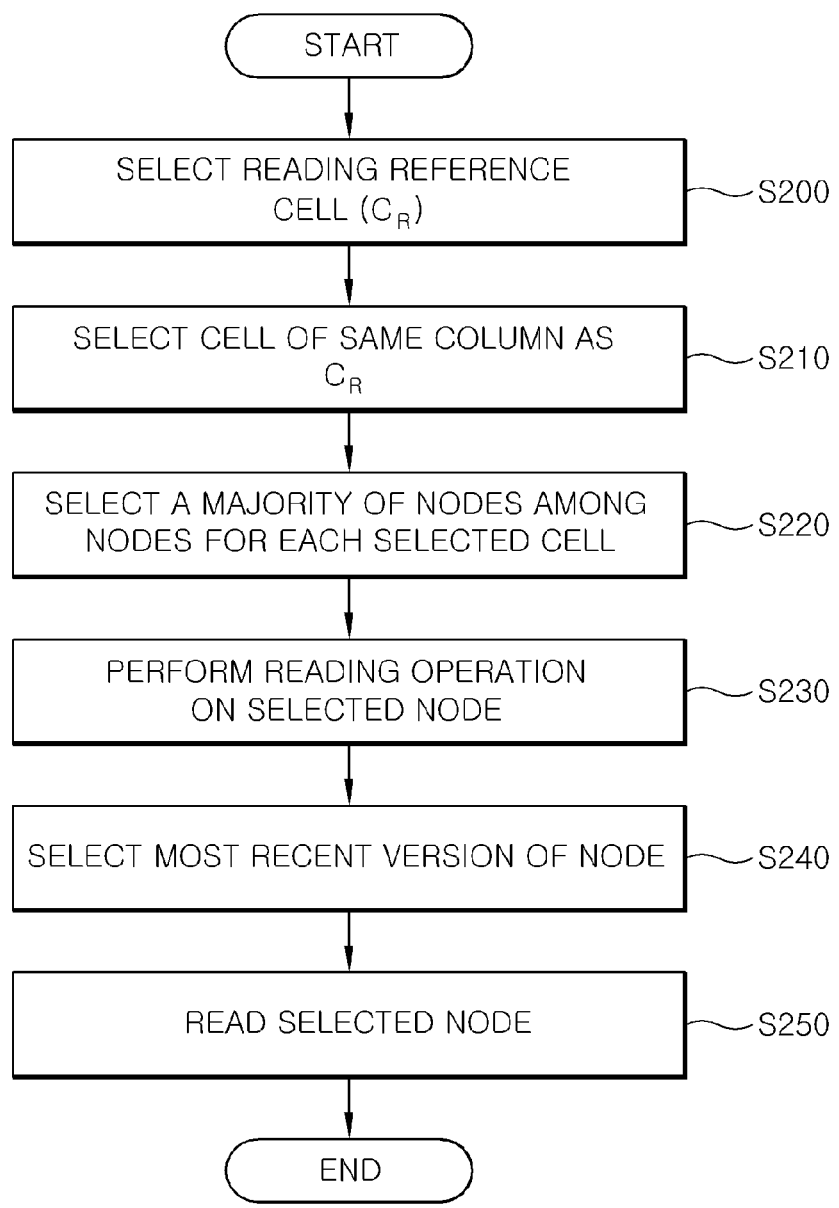

FIG. 3 is a flow chart showing a method for selecting a node in a network system according to one embodiment of the present invention and in particular, shows a method for selecting a node to perform a reading operation. At this time, it is assumed that the operation of FIG. 3 is made after performing the writing operation.

The method for selecting a node to perform the reading operation of FIG. 3 includes the plurality of nodes existing on the large-capacity cluster and is performed in the network system having the network area divided into the plurality of cells. This process is previously performed in FIG. 2 and thus, it will not be repeated in the process of FIG. 3.

When performing the reading operation on the plurality of nodes included the cell group consisting of the plurality cells, any one of the plurality of divided cells is selected as the reading reference cell ($C_R$) (S200). At this time, the reading cell is designated by selecting the reading reference cell ($C_R$) and at least one cell adjacent to the reading reference cell ($C_R$) (S210).

Herein, the reading cell includes the cell arranged on a column or row at the same position as the reading reference cell ($C_R$) and the reading reference cell ($C_R$) In other words, the writing cell is selected cells arranged on a column and row at the same position as the writing reference cell ($C_W$), while the reading cell is selected cells arranged on a column at the same position as the reading reference cell ($C_R$) or cells arranged on a row at the same position as the reading reference cell ($C_R$).

When the reading cell is designated in 'S200' and 'S210' steps, the nodes included in each cell designated as the reading cell are detected. At this time, a majority of the nodes among the nodes included in the cells designated as the reading cells are selected (S220) and the reading operation is performed on the selected nodes (S230). Herein, each of 'S220' and 'S230' steps is performed for each cell selected as the reading cells.

Meanwhile, a recent version of each of the selected nodes is confirmed in order to select the most recent version of the nodes (S240) and the predetermined data are obtained from the most recent version of the selected nodes (S250).

FIGS. 4 to 11 are diagrams for explaining the operation of the method for selecting a node in a network system according to one embodiment of the present invention. The following embodiment describes a case where the cell group has a matrix structure of 3×3 as an example but is not limited thereto. The cell group may be formed to have a matrix structure of M×N. Preferably, the cell group may be formed to have a matrix structure of N×N.

Figure 4:
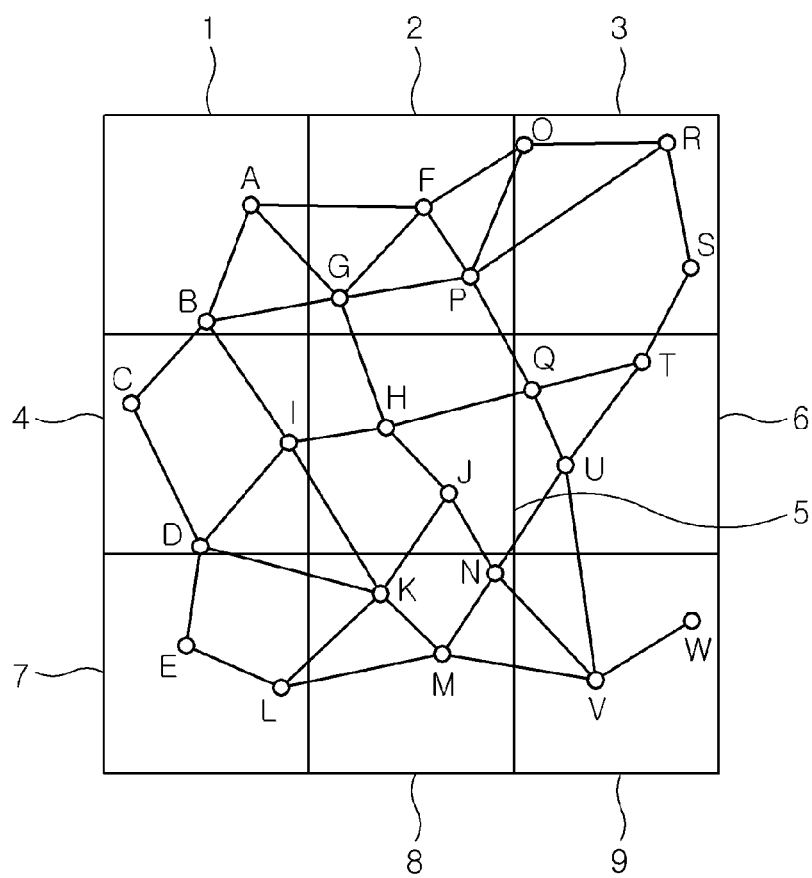
FIG. 4 shows an embodiment of a cell group applied to the method for selecting a node according to the present invention.

First, FIG. 4 shows a cell group formed by dividing the network area including the plurality of nodes existing on the large-capacity cluster, that is, A to W nodes. At this time, a case where the cell group is divided into a total of 9 cells is described as an example, wherein it is assumed that each cell is optionally assigned numbers 1 to 9.

In other words, according to the embodiment of FIG. 4, a cell assigned number 1 includes A and B nodes, a cell assigned number 2 includes F, G, and P nodes, a cell assigned number 3 includes O, R, and S nodes, a cell assigned number 4 includes C, D, and I nodes, a cell assigned number 5 includes H and J nodes, a cell assigned number 6 includes Q, T, and U nodes, a cell assigned number 7 includes E and L nodes, a cell assigned number 8 includes K, M, and N nodes, and a cell assigned number 9 includes V and W nodes, respectively.

Figure 5:
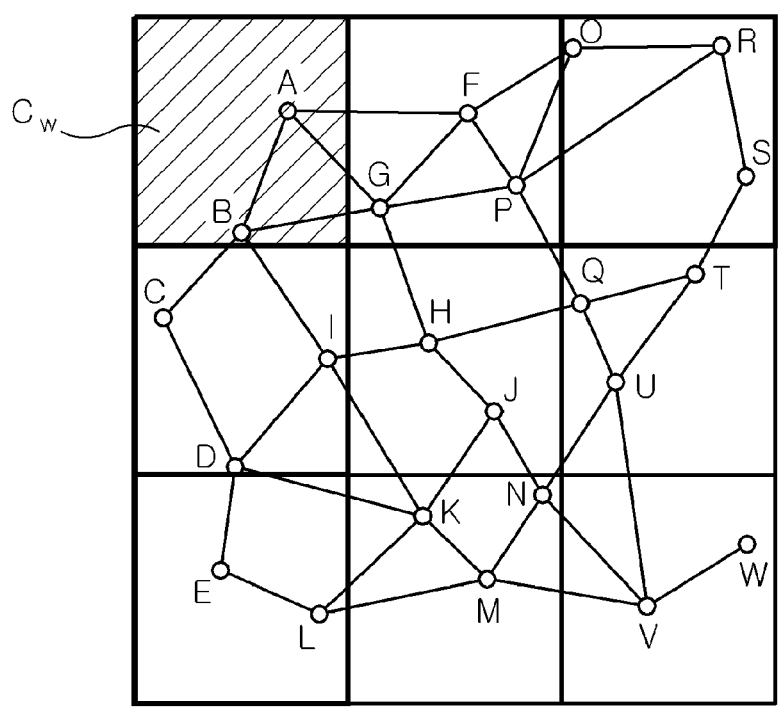
Figure 6:
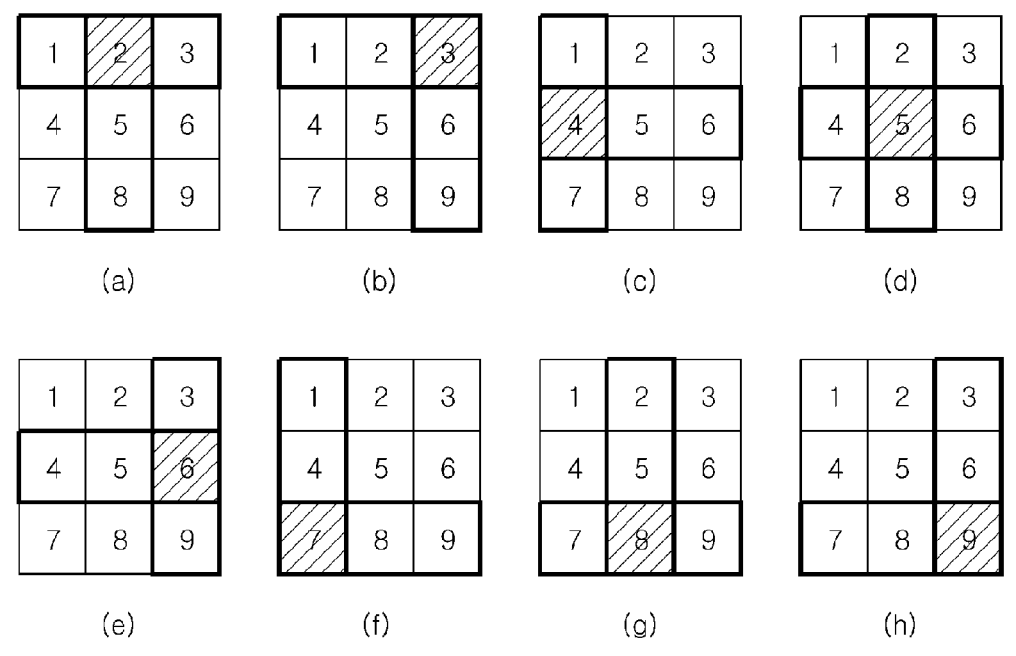
Figure 7:
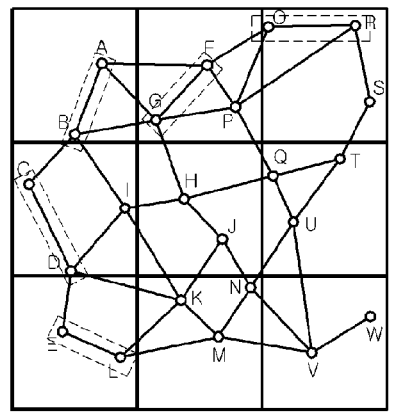
Figure 7:
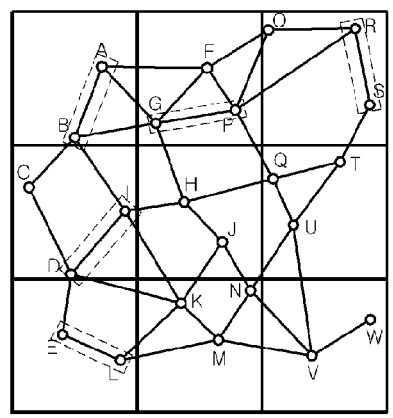
Figure 7:
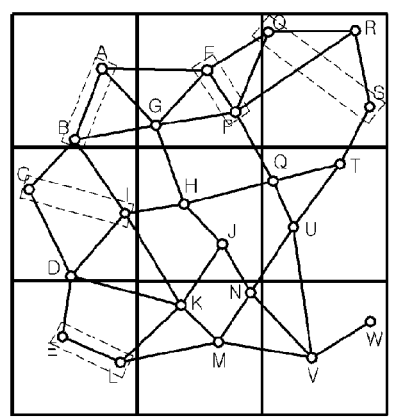

Meanwhile, FIGS. 5 to 7 diagrams for explaining the operation of selecting the node to perform the writing operation from the embodiment of FIG. 4.

First, FIG. 5 shows a case where a cell assigned number 1 among a total of 9 cells is selected as the reference cell ($C_W$). At this time, the writing cell is designated by selecting the cells assigned numbers 2 and 3 positioned at the same column as the writing reference cell and the cells assigned numbers 4 and 7 positioned at the same row as the writing reference cell.

Of course, the writing reference cell ($C_W$) is not limited to the cell at the specific position, but can be selected from the cells assigned numbers 2 and 9 as shown in FIGS. 6A to 6H. In this case, the writing cell is changed according to the position of the writing reference cell ($C_W$) and as shown in FIGS. 6A to 6H, the writing cell is designated by selecting the cell arranged on a column and row at the same position as the writing reference cell.

FIGS. 7A to 7C show an embodiment of selecting the writing nodes based on the writing cells designated in FIG. 5.

As shown in FIGS. 7A to 7C, when the writing cells are designated as numbers 1, 2, 3, 4, and 7, the majority of the nodes for each cell among the nodes included in each cell are selected.

In other words, since two nodes are included in the cell assigned number 1, all of the A and B nodes are selected. Further, since three nodes are included in the cell assigned number 2, two nodes, which are the majority of nodes among F, G, and P, are selected. At this time, any one of (F, G), (G, P), and (F, P) is selected. Likewise, since three nodes are included in the cell assigned number 3, two nodes, which are the majority of nodes among O, R, and S, are selected. At this time, any one of (O, R), (R, S), and (O, S) is selected.

Further, since three nodes are included in the cell assigned number 4, two nodes, which are the majority of nodes among C, D, and I, are selected. At this time, any one of (C, D), (D, I), (C, I) is selected. Meanwhile, since two nodes include the cell assigned number 7, all of the E and L nodes are selected.

Of course, FIGS. 7 A to 7C show one embodiment. In addition to this, the embodiment can be variously implemented. Therefore, as shown in FIGS. 7A to 7C, 10 of the nodes included in the writing cells are selected and the writing operation is performed on the selected 10 nodes.

Figure 8:
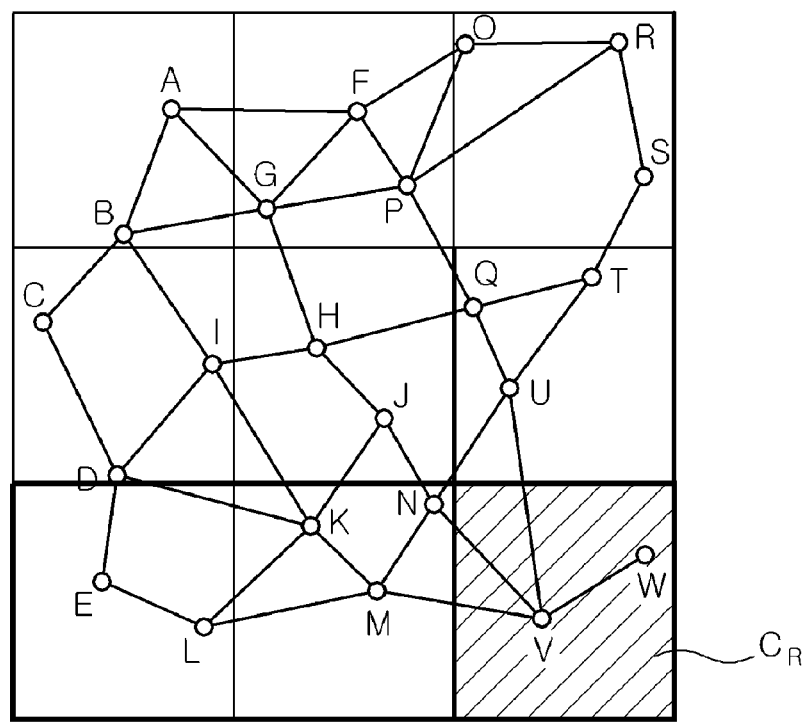
Figure 9:
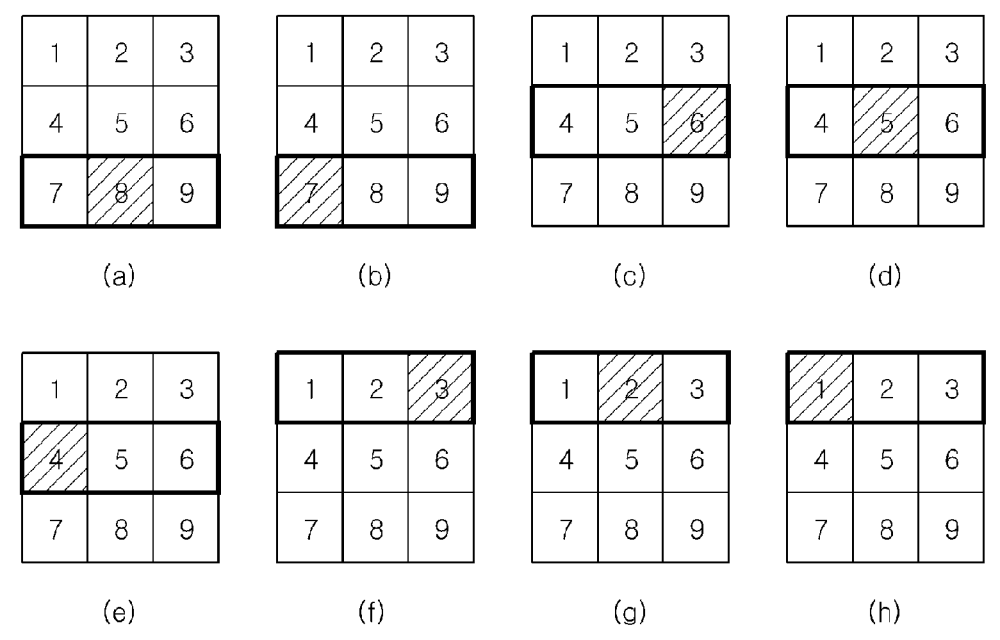
Figure 10:
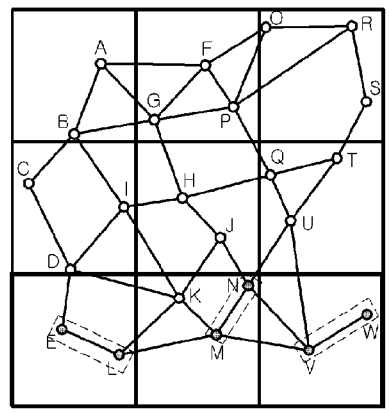
Figure 10:
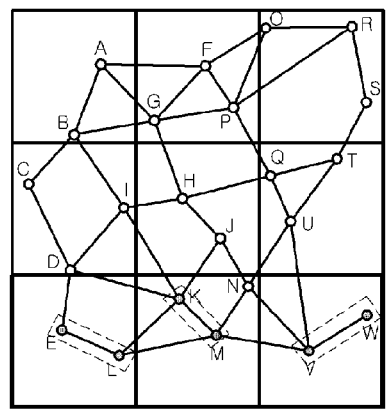
Figure 10:
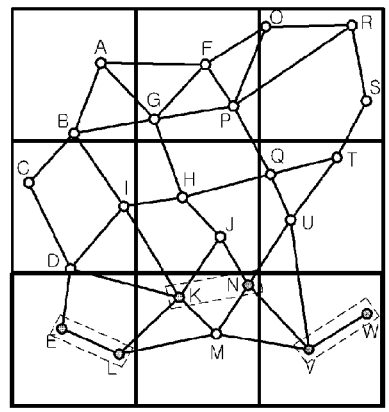

Meanwhile, FIGS. 8 to 10 are diagrams for explaining the operation of selecting the node to perform the writing operation from the embodiment of FIG. 4.

First, FIG. 8 shows a case where the cell assigned number 9 among a total of 9 cells is selected as the reference cell ($C_R$). At this time, the reading cell is designated by selecting the cells assigned numbers 7 and 8 positioned at the same column as the reading reference cell ($C_R$).

Of course, the reading reference cell ($C_R$) is not limited to the cell at the specific position similar to the writing reference cell ($C_W$), but can be selected from the cells assigned with numbers 1 and 8 as in FIGS. 9A to 9H. In this case, the reading cell is changed according to the position of the reading reference cell ($C_R$) and as shown in FIGS. 9A to 9H, the reading cell is designated by selecting the cell arranged on a column at the same position as the reading reference cell. Meanwhile, the reading cell can also be designated by selecting the cell arranged on a row at the same position as the reading reference cell according to the setting.

FIGS. 10A to 10C show an embodiment of selecting the reading node from the reading cell designated in FIG. 8.

As shown in FIGS. 10A to 10C, when the reading cells are assigned as numbers 7, 8, and 9, the majority of the nodes for each cell among the nodes included in each cell are selected.

In other words, since two nodes are included in the cell assigned number 7, all of the E and L nodes are selected. Further, since three nodes are included in the cell assigned with number 8, two nodes, which are the majority of nodes among K, M, and N, are selected. At this time, any one of (M, N), (K, M), and (K, N) is selected. Likewise, since two nodes are include the cell assigned number 9, all of the V and W nodes are selected.

Of course, FIGS. 10 A to C show one embodiment. In addition to this, the embodiment can be variously implemented. Therefore, as shown in FIGS. 10A to 10C, 6 of the nodes included in the reading cells are selected and the reading operation is performed on the selected 6 nodes.

Meanwhile, the version of each node is confirmed by reading the selected 6 nodes. At this time, the most recent version of nodes are discriminated to obtain the data recorded in the corresponding nodes.

In other words, describing FIG. 7A and FIG. 10A as an example, in FIG. 7A, the cells assigned numbers 1, 2, 3, 4, and 7 are designated as the writing cells and in FIG. 10A, the cells given numbers 7, 8, and 9 are designated as the reading cells. Herein, the recent version of data is recorded in the node of the cell assigned number 7 designated as the writing cell in FIG. 7A among the cells assigned numbers 7, 8, and 9 designated as the reading cells.

Figure 11:
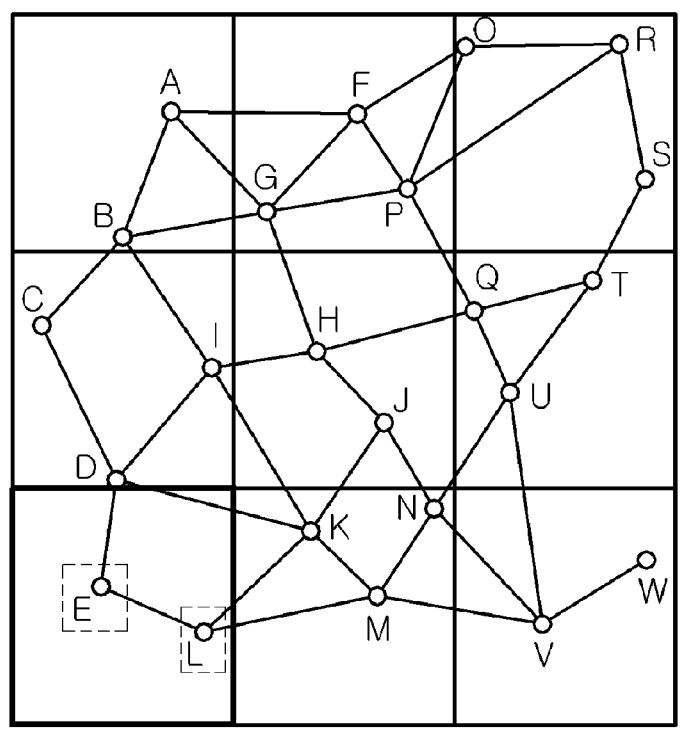

Therefore, as shown in FIG. 11, since the recent version of data is recorded in (E, L) among 7: (E, L), 8: (M, N), and 9: (V, W) selected as the reading node, the most recent data is obtained from the E node or the L node.

Although not shown in the drawings, when the cell on the same row is designated as the reading cell by using the cell assigned number 9 as the reading reference cell, two nodes among O, R, and S of the cell assigned number 3 are selected as the reading nodes and two nodes selected from Q, T, and U in the cell assigned number 6 are selected as the reading nodes. Further, in the cell assigned number 9, the V and W nodes are selected as the reading nodes. At this time, the reading nodes are a total of 6. Among others, at least one of the two nodes selected from the cell assigned number 3 overlap with the writing cell is recorded with the recent version of data. Therefore, it is possible to obtain predetermined data by selecting the node in which the most recent version of data is data.

FIG. 12 shows a comparison table of the method for selecting a node according to one embodiment of the present invention. Referring to FIGS. 12A to 12C, FIG. 12A shows the reading/writing results when performing the reading/writing operations of 23 nodes by using the single reading/writing method in the related art and FIG. 12B shows the reading/writing results when performing the reading/writing operations of 23 nodes by using the majority vote method in the related art. Meanwhile, FIG. 12C shows the reading/writing results when performing the reading/writing operations of 23 nodes by using the method for selecting a node according to the present invention, that is, the cell approximation method.

In other words, in FIG. 12A, all of the writing operations are performed on a total of 23 nodes and then, the reading operation is performed on one selected node by selecting any one of the 23 nodes. In this case, as the reading operation is performed on only one node but the writing operation is performed on all of the nodes, the network access is delayed.

Further, in FIG. 12B, the writing operation is performed on 12 nodes, which are the majority of nodes among a total of 23 nodes. Likewise, the reading operation is performed on 12 nodes, which are the majority of nodes among the total of 23 nodes. In this case, it can be confirmed that the number of nodes, which participates in the writing operation, are significantly reduced as compared to FIG. 12 A. However, since the number of nodes, which participates in the reading operation, is relatively increased 12 times, the network access is similarly delayed to FIG. 12A.

Meanwhile, in FIG. 12C, 10 nodes included in 7 cells selected as the writing cells among a total of 9 cells formed for a total of 23 nodes participate in the writing operation. Among others, 6 nodes included in 3 cells selected as the reading cells participate in the reading operation. Herein, in FIG. 12C as compared to FIGS. 12A and 12B, it can be confirmed that the number of nodes, which participates in the writing operation, is reduced. In addition, it can be confirmed that the number of nodes, which participate in the reading operation, is also reduced as compared to FIG. 12B. Therefore, as the number of nodes, which participates in the reading/writing operations, is totally reduced, the network access delay can be reduced.

As described above, although the method for selecting a node in a network system and the system thereof is described with reference to the illustrated drawings, the present invention is not limited to the embodiment disclosed in the specification and the drawings but can be applied within the technical scope of the present invention.

What is claimed is:

1. A method for selecting a node in a network system, comprising:
   dividing a network area including a plurality of nodes existing on a large-capacity cluster into a plurality of cells;
   selecting any one of the plurality of cells as a writing reference cell;
   selecting the writing reference cell and at least one cell adjacent to the writing reference cell to designate writing cells;
   selecting a majority of the nodes for each writing cell among the nodes included in the writing cells; and
   performing a writing operation on the selected nodes for each writing cell,
   wherein the plurality of cells includes all the nodes, and
   the total number of nodes is larger than the total number of cells.

2. The method for selecting a node in a network system according to claim 1, wherein in the dividing the network area into the plurality of cells, the plurality of cells are divided in a grid form.

3. The method for selecting a node in a network system according to claim 2, wherein the grid form has a structure where a number of cells arranged on a column and a number of cells arranged on a row are equal.

4. The method for selecting a node in a network system according to claim 2, wherein the at least one cell adjacent to the writing reference cell is selected as a cell arranged on the same column or row as the writing reference cell.

5. A method for selecting a node in a network system including a plurality of nodes existing on a large-capacity cluster and having a network area in which a plurality of cells are divided, comprising:

selecting any one of the plurality of cells as a reading reference cell;

selecting the reading reference cell and at least one cell adjacent to the reading reference cell to designate reading cells;

selecting a majority of the nodes for each reading cell among nodes included in the reading cells; and performing a reading operation on the selected nodes for each reading cell, wherein the plurality of cells includes all the nodes, and the total number of nodes is larger than the total number of cells.

6. The method for selecting a node in a network system according to claim 5, wherein the plurality of cells are divided in a grid form.

7. The method for selecting a node in a network system according to claim 6, wherein the grid form has a structure where the number of cells arranged on a column and a number of cells arranged on a row are equal.

8. The method for selecting a node in a network system according to claim 6, wherein the at least one cell adjacent to the reading reference cell is selected as a cell arranged on the same column as the reading reference cell.

9. The method for selecting a node in a network system according to claim 6, wherein the at least one cell adjacent to the reading reference cell is selected as a cell arranged on the same row as the reading reference cell.

10. The method for selecting a node in a network system according to claim 5, further comprising selecting a recent version of nodes by confirming a version of selected nodes and obtaining predetermined data from the recent version of nodes.

11. A network system performing a method for selecting a node, the method comprising:

dividing a network area including a plurality of nodes existing on a large-capacity cluster into a plurality of cells;

selecting any one of the plurality of cells as a writing reference cell;

selecting the writing reference cell and at least one cell adjacent to the writing reference cell to designate writing cells;

selecting a majority of the nodes for each writing cell among the nodes included in the writing cells; and performing a writing operation on the selected nodes for each writing cell, wherein the plurality of cells includes all the nodes, and the total number of nodes is larger than the total number of cells, the network system comprising:

the plurality of nodes existing on the large-capacity cluster, and a network area in which the plurality of cells are divided.

* * * * *